(12) United States Patent  
King (10) Patent No.: US 6,401,340 B1  
(45) Date of Patent: Jun. 11, 2002

(54) CUTTER FOR THIN WALL METALLIC TUBING

(76) Inventor: Franklin H. King, 3950 Coburg Rd., Sp. 34, Eugene, OR (US) 97408

( * ) Notice: Subject to any disclaimer, the term of this patent is extended or adjusted under 35 U.S.C. 154(b) by 0 days.

(21) Appl. No.: 09/625,691

(22) Filed: Jul. 26, 2000

(51) Int. Cl.⁷ .............................................. B23D 21/06
(52) U.S. Cl. ......................................... 30/102; 30/101
(58) Field of Search ........................ 30/101, 102, 307, 30/319, 90.1, 164.95

(56) References Cited

U.S. PATENT DOCUMENTS

| | | |
|---|---|---|
| 73,528 A | 1/1868 | Hartford |
| 134,477 A | 12/1872 | Jepson |
| 171,789 A | 1/1876 | Franke |
| 2,739,381 A * | 3/1956 | Petersen ..................... 30/101 |
| 3,013,335 A | 12/1961 | Kowal |
| 3,171,199 A | 3/1965 | Meese |
| 5,414,932 A | 5/1995 | Azkona |
| 5,515,609 A | 5/1996 | Sperti |
| 5,765,289 A * | 6/1998 | Schulz et al. .................. 30/319 |
| 5,907,906 A | 6/1999 | Sweeney |

* cited by examiner

*Primary Examiner*—Douglas D. Watts
(74) *Attorney, Agent, or Firm*—Robert E. Howard (57) ABSTRACT

A tubing cutter for cutting thin walled metallic tubing of the type used for electrical conduit. The tubing cutter is of the type which supports the tubing being cut between a roller or rollers and an oppositely disposed rotary cutting wheel of a given radius located within the head of the cutter, the cutter being rotated around the tubing to cause the cutting wheel to cut into and through the wall of the tubing. The cutter is prevented from cutting all the way through the wall of thin walled metallic tubing by means of a depth gage stop member which contacts the tubing to terminate cutting. The depth gage stop member can be stationary or rotary, and is comprised of a pair of legs or rollers placed on each side of the rotary cutting wheel. The length of the legs or the radius of the rollers are less than the radius of the rotary cutting wheel by a distance that represents less than the wall thickness of the tubing to be cut.

9 Claims, 7 Drawing Sheets

CUTTER FOR THIN WALL METALLIC TUBING

BACKGROUND OF THE INVENTION

This invention relates to a tubing cutter. More specifically, this invention relates to a cutter for thin wall tubing such as electrical metallic tubing.

Tubing cutters have been used extensively for many years for cutting metal or plastic tubing and piping for various uses. Such tubing cutters typically have a cutter blade or cutter wheel disposed opposite a pair of rollers. The device is rotated around the tubing in order to cut through the tubing around a circumference thereof. Such devices include means for advancing the blade or wheel into the tubing as the device is rotated around the tubing.

However, under existing building codes, such tubing cutters cannot be used for cutting electrical metallic tubing ("EMT"). EMT must be cut using a hacksaw, which is more laborious. The reason behind the building code ban of such tubing cutters for cutting EMT is that EMT has a thin wall, about ½2 inch in thickness, and conventional tubing cutters compresses the tubing during cutting, thereby reducing its internal diameter. If wiring is pulled through such reduced diameter EMT, the extra resistance caused by the reduced diameter of the EMT can cause the wiring's diameter to be reduced thereby creating less amperage carrying capacity.

In addition, conventional tubing cutters leave a rough inside burr which can skin insulation from the wiring as it is pulled through the EMT.

SUMMARY OF THE INVENTION

It is an object of the present invention to provide a rotary tubing cutter for thin wall conduit that does not reduce the internal diameter of the conduit during cutting.

It is another object to provide a rotary tubing cutter for thin wall conduit which leaves a minimal internal burr which can be easily removed with a reamer.

These and other objects are accomplished by providing a depth gage stop means associated with the cutting member of the tubing cutter which prevents the cutting member from cutting entirely through the wall of the EMT. After the wall of the EMT is partially cut through, preferably about 50% of the way through, the tubing cutter is removed from the EMT, and the EMT manually broken in two at the partial cut.

DESCRIPTION OF PREFERRED EMBODIMENTS

The tubing cutter of the present invention uses a depth gage stop member, located in the proximity of the tubing cutter wheel, which contacts the tubing being cut prior to the cutter wheel cutting all the way through the wall of the tubing, thereby terminating the cutting action of the cutter wheel. After termination of cutting, preferably at a location about 50% of the way through the thickness of the tubing wall, the tubing is easily broken in two at the location of the cut by manual bending pressure. By terminating the cutting action of the cutter wheel prior to the tubing wall being cut all the way through, and breaking the tubing to complete the separation of the tubing into two parts, reduction of the diameter of the tubing at the location of the cut is avoided.

The present invention utilizes either a stationary type depth gage stop member (one embodiment being illustrated in FIGS. 1 and 2 and another embodiment being illustrated in FIGS. 5–7) or a rotary type depth gage stop member (illustrated in FIGS. 3, 4, 8 and 9).

In the various embodiments illustrated in the drawings, common parts have common numbers.

Figure 1:
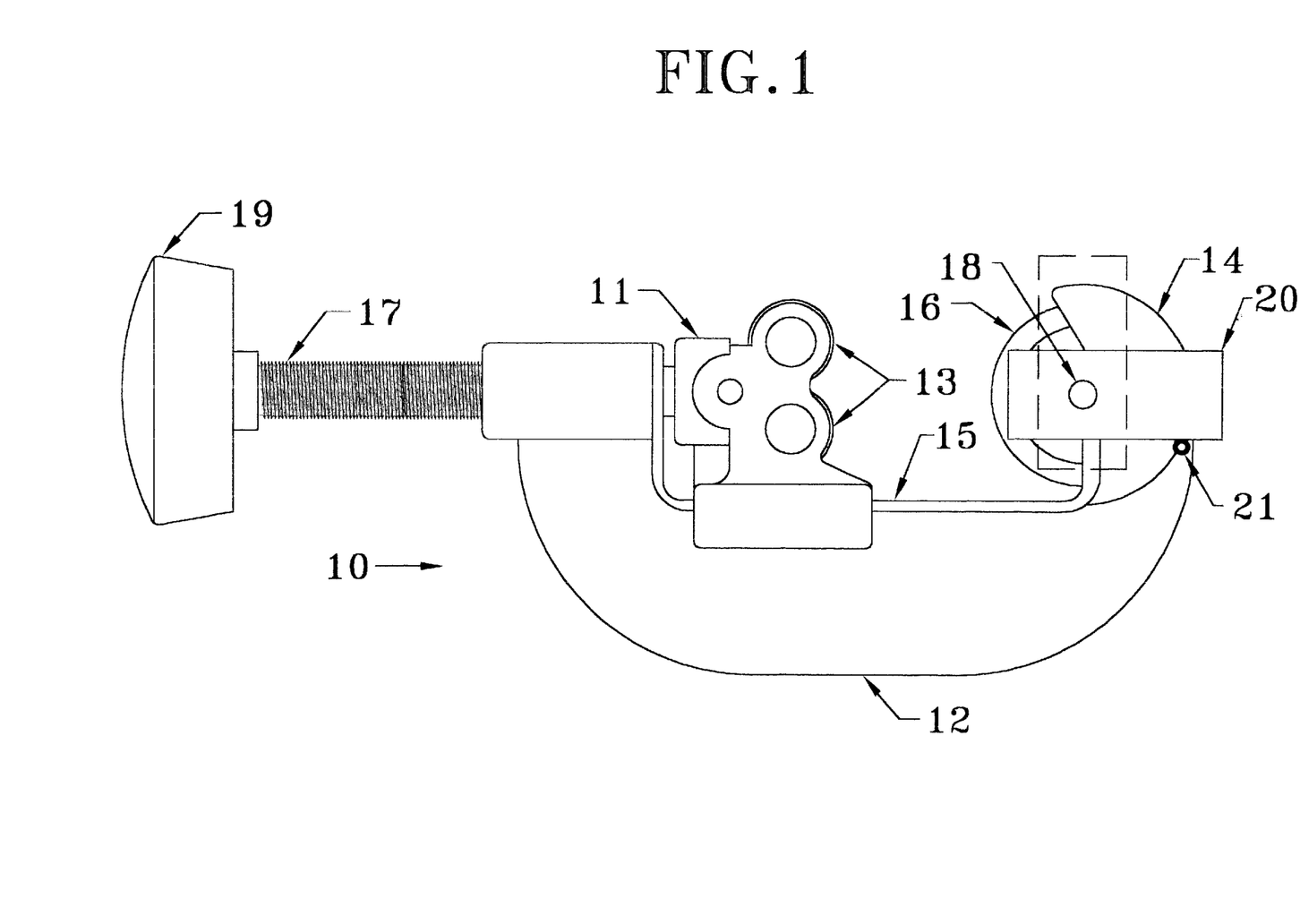
FIG. 1 is a side view of a first embodiment of the present invention using a stationary type depth gage stop.

In FIG. 1, a tubing cutter 10 has a generally C-shaped frame 12 having a cutting head 14 at a first end thereof. A disc shaped cutting wheel 16 is rotatably journalled on axle 18. A carriage 11 having clamping wheels 13 is movable back and forth along rail 15 by means of screw 17 threadably received through a bore found in the second end of the cutter, the screw 17 being rotated by handle 19.

In operation, the piece of tubing to be cut is placed against clamping wheels 13 and screw 17 turned by handle 19 to urge the tubing against cutting wheel 16. Cutting is effected by rotating cutter 10 around the tubing. As cutting takes place the tubing is urged toward cutting wheel 16 by periodically turning handle 19.

A generally U-shaped stationary depth gage stop member 20 is pivotally mounted on axle 18. Depth gage stop member 20 is comprised of a base 22 with two substantially parallel legs 24 and 26 extending perpendicularly therefrom.

Figure 2:
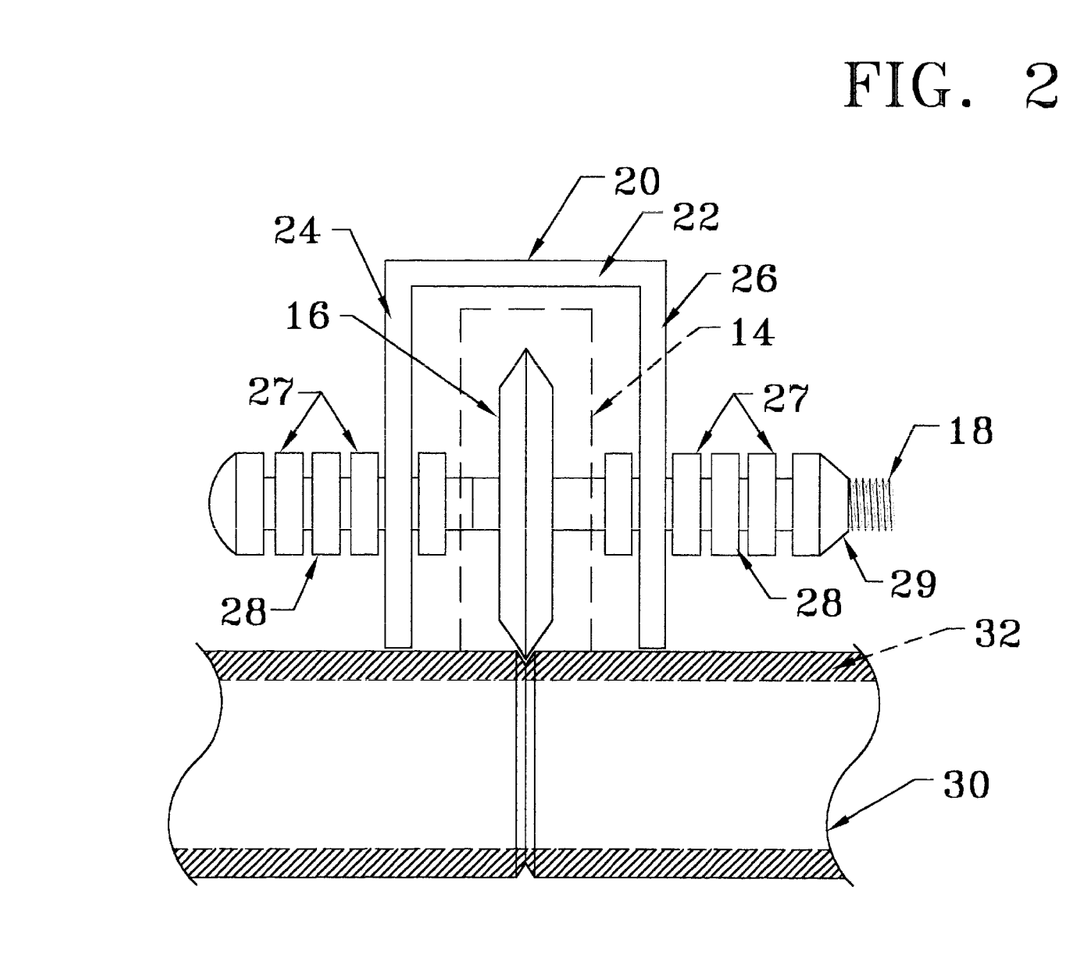
FIG. 2 is a partial top view of the stationary depth gage stop of the first embodiment of the present invention.

As seen in FIG. 2, axle 18 is a bolt having flat washers 27, friction washers 28, and a lock nut 29 located on the threaded end thereof. For sake of clarity lock nut 29 is shown in its untightened position with washers 27 and 28 loosely arrayed along axle 18.

Depth gage stop member 20 can be rotated between a first, inoperable, position (shown in phantom in FIG. 1) that is substantially perpendicular to the longitudinal axis of tubing cutter frame 12 and a second, operable, position (as shown in FIG. 1) that is substantially parallel to the longitudinal axis of tubing cutter body frame member 10. As it is rotated from its non-operable position toward its operable position, legs 24 and 26 of depth gage stop member 20 come into contact with stop pin 28 at its operable position. When depth gage stop member 20 is rotated to its inoperable position the tubing cutter 10 may be used as a normal tubing cutter for cutting thicker walled tubing such as copper tubing.

To illustrate how depth gage stop member 20 prevents cutting wheel 12 from cutting through tubing wall, a partial piece of tubing 30 is shown in FIG. 2. As can be seen, cutter wheel 16 has partially cut through the wall 32 of tubing 30. Cutter wheel 16 is prevented from cutting deeper into wall 32 by virtue of the outer ends of legs 24 and 26 of depth gage stop member 20 contacting the outer surface of wall 32 of tubing 30.

Figure 3:
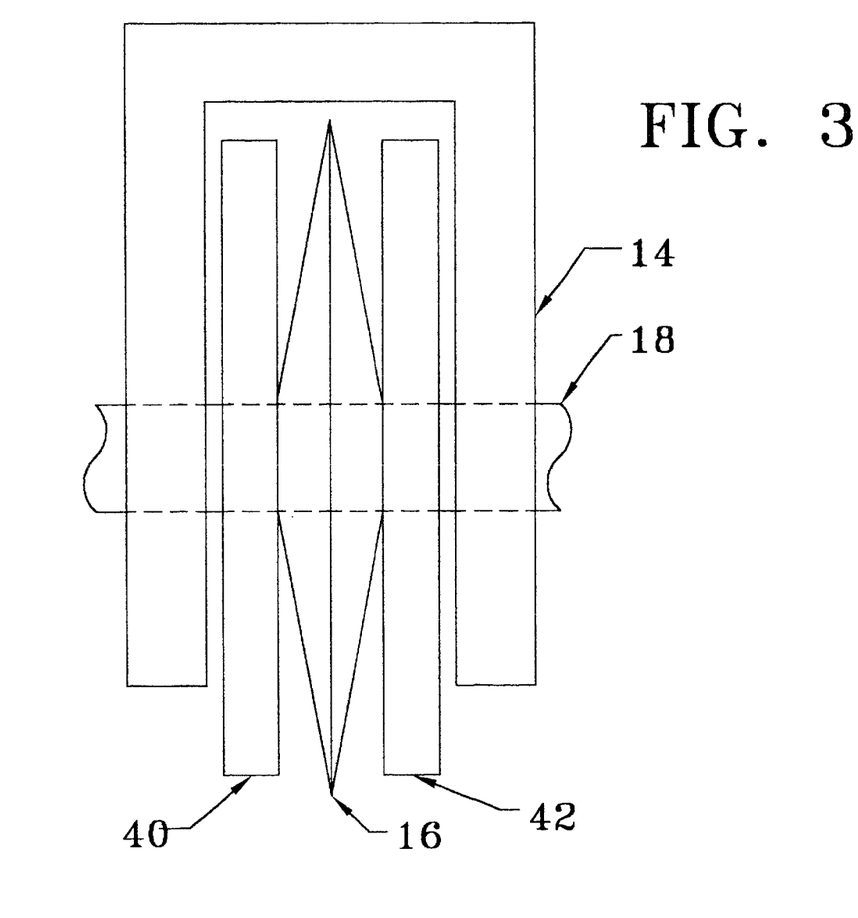
FIG. 3 a partial top view of a second embodiment of the present invention using a rotary type depth gage stop.

In FIG. 3 a second embodiment of the depth gage stop member is illustrated. In FIG. 3, a rotary type depth gage stop member is comprised of two parallel rollers 40 and 42 located inside tubing cutter head 14 and on each side of cutting wheel 16. Tubular spacing members can be placed into the space between the outer planar surfaces of rollers 40 and 42 and the inner surface of cutter head 14 to hold rollers 40 and 42 and cutting wheel 16 in place, if needed.

Rollers 40 and 42 have the same diameter with their centers located on a common axis, axle 18. The difference between the radii of rollers 40 and 42 and cutting wheel 16 is the distance into the wall of a piece of tubing it is desired to cut. In cutting into such tubing, rollers 40 and 42 come into contact with the outer surface of the tubing when the desired depth of cut is achieved, and prevents further cutting by the cutting wheel 16.

Figure 4:
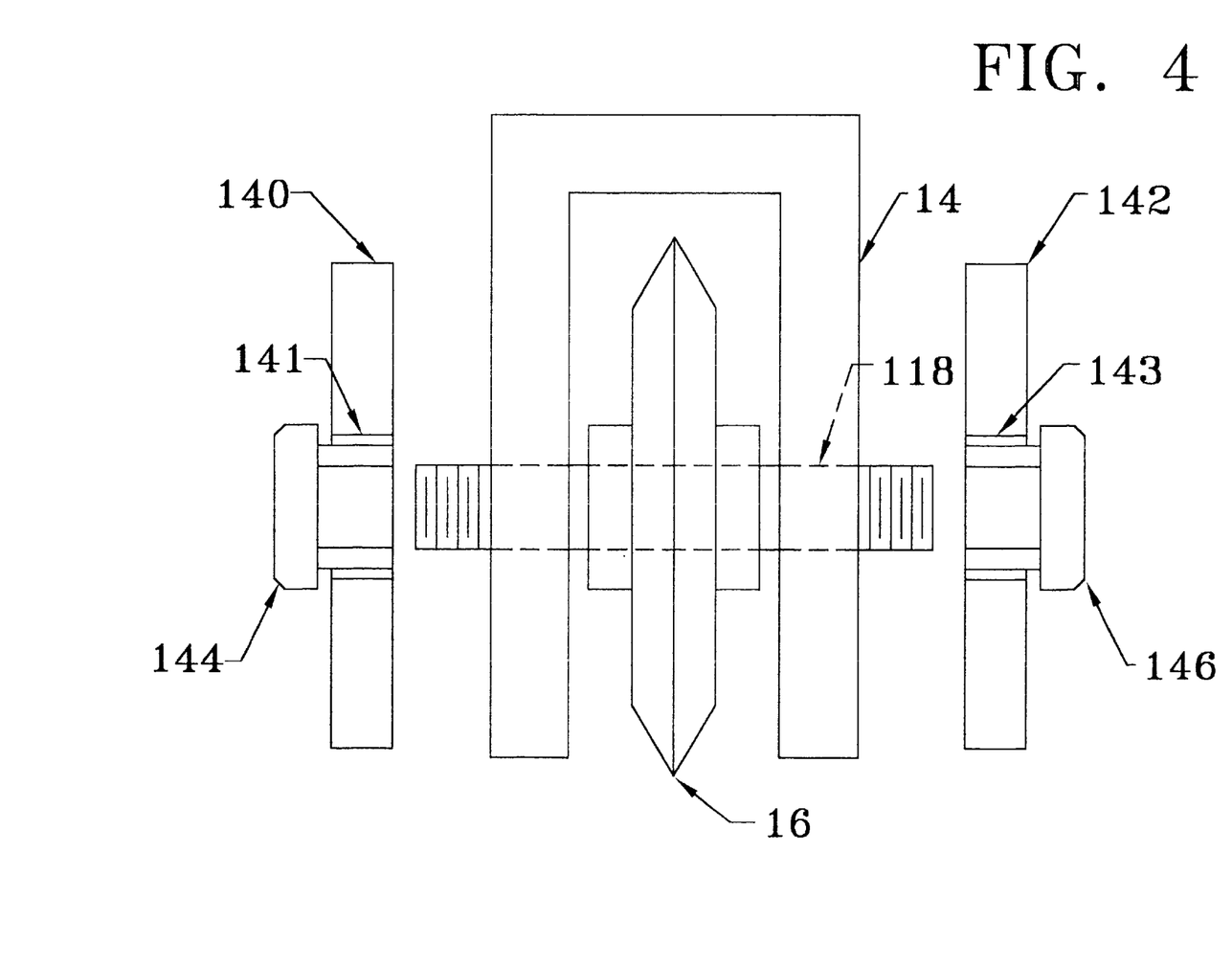
FIG. 4 is a partial exploded view of a modification to the rotary type depth gage stop of the second embodiment of the present invention.

A variation of the second embodiment of FIG. 3 is illustrated in FIG. 4. The primary difference between the devices of FIGS. 3 and 4 is that in the embodiment shown in FIG. 4 depth gage stop member rollers 140 and 142 are located on the outside of tubing cutter head 14. Rollers 140 and 142 have the same diameter with their centers located on a common axis with cutting wheel 16 and axle 118. Axle 118 is threaded at both ends, which extend beyond cutter head 14, as shown. Dead end stop nuts 144 and 146 screw onto the threaded ends of axle 118, extending through roller ports 141 and 143, respectively. Rollers 140 and 142 are suitably journalled on stop nuts 144 and 146.

As with rollers 40 and 42, rollers 140 and 142 have the same diameter. The difference between the radii of rollers 140 and 142 and cutting wheel 16 is the distance into the wall of a piece of tubing it is desired to cut. In cutting into such tubing, rollers 140 and 142 come into contact with the outer surface of the tubing when the desired depth of cut is achieved, and prevents further cutting by the cutting wheel 16.

Figure 5:
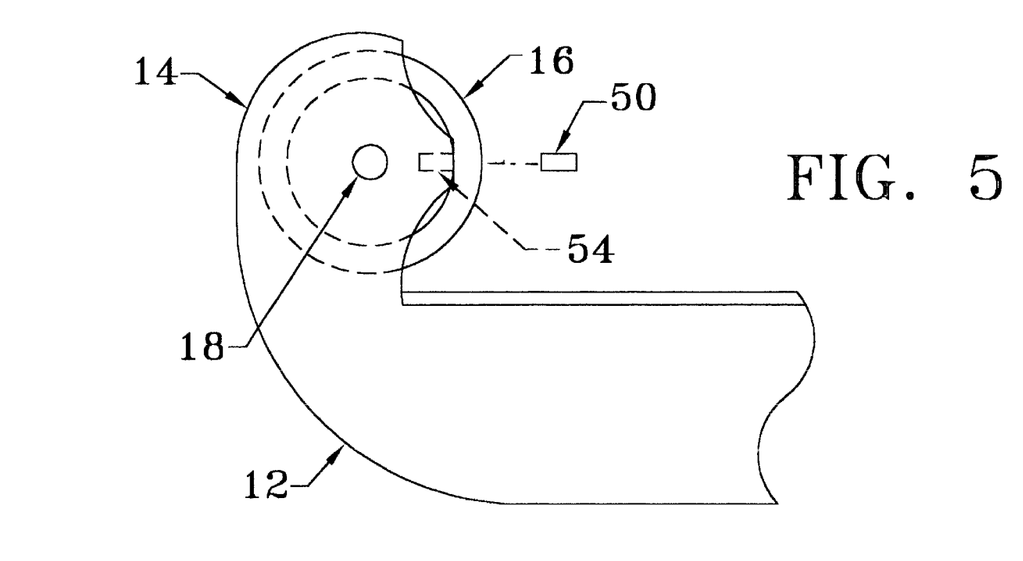
FIG. 5 is an exploded side view of a third embodiment of the present invention using a stationary type depth gage stop.
Figure 6:
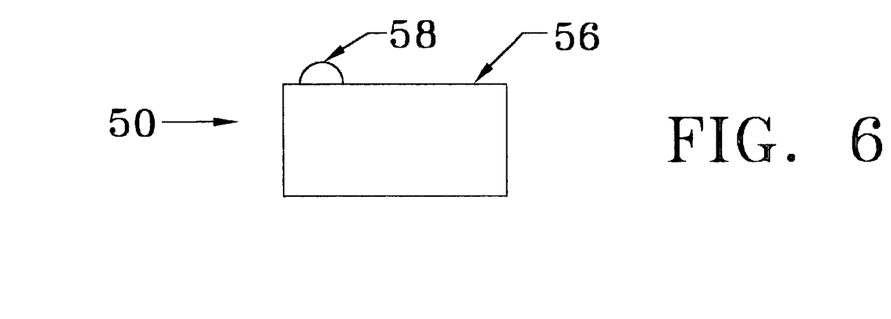
FIG. 6 is a side view of the stationary depth gage stop of the third embodiment of the present invention.
Figure 7:
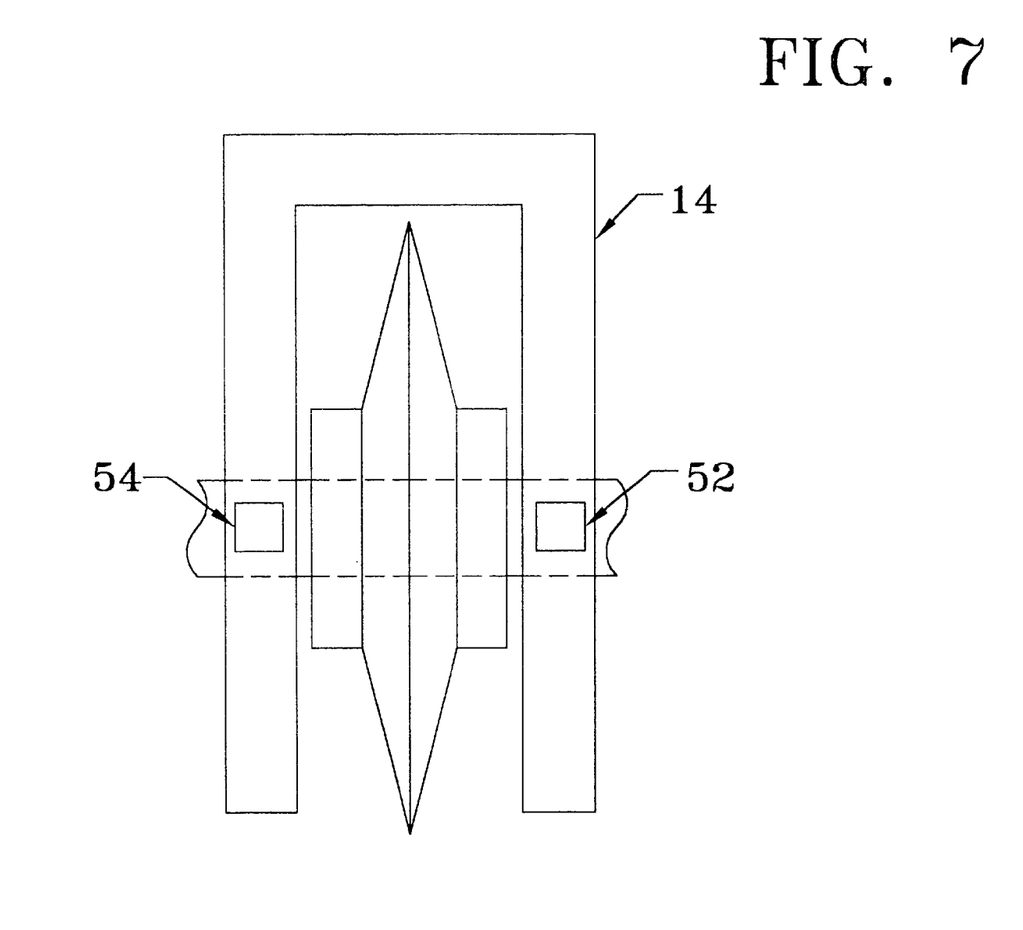
FIG. 7 is a partial front view of the third embodiment of the present invention.

A third embodiment is illustrated in FIGS. 5–7. In this embodiment, identical depth gage stop members 50 are inserted into cavities 52 and 54 located in the front of cutter head 14. Each stop member 50 is comprised of a tubular body member 56 which is generally rectangular in cross-section. Stop members 50 are inserted into cavities 52 and 54 and pushed inwardly until the inner end thereof contacts the inner end of the respective cavity. Each stop member 50 has a hemispherical detent 58 extending from an outer surface thereof. Detent 58 is spring loaded to be urged outwardly against the adjacent surface of cavity 52 or 54 to prevent stop members 50 from falling out of cutter 10 when not in use. Stop members 50 can be made of different lengths, depending on the wall thickness of the tubing being cut. Typically, one length would be used for ½ inch and ¾ inch tubing and a shorter length for one inch tubing (in order to make a deeper cut).

Although the stop members 50 are illustrated as having a rectangular cross-section, they may have other cross-sections, such as circular.

Figure 8:
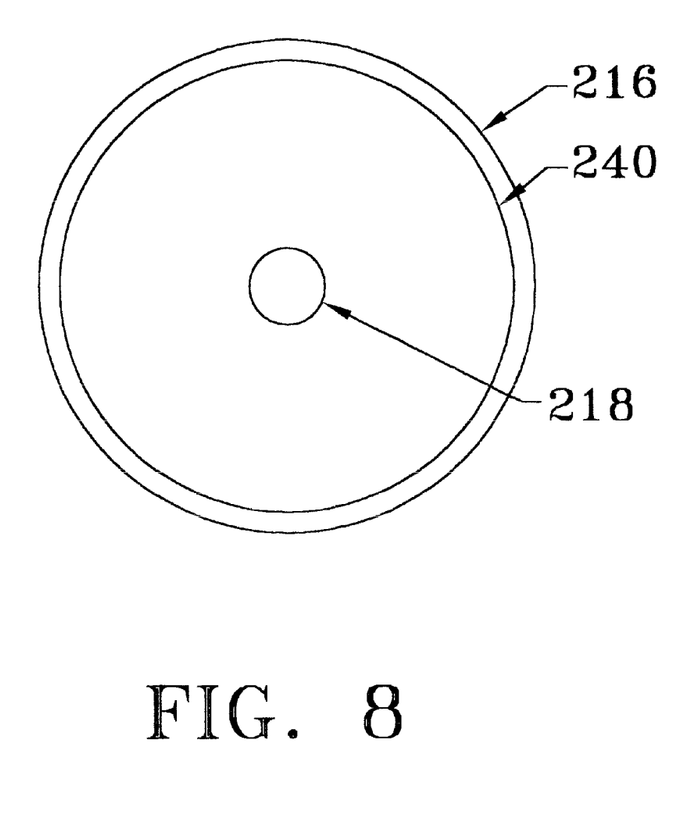
FIG. 8 is a side view of a unitary cutting wheel and rotary type depth gage stop.
Figure 9:
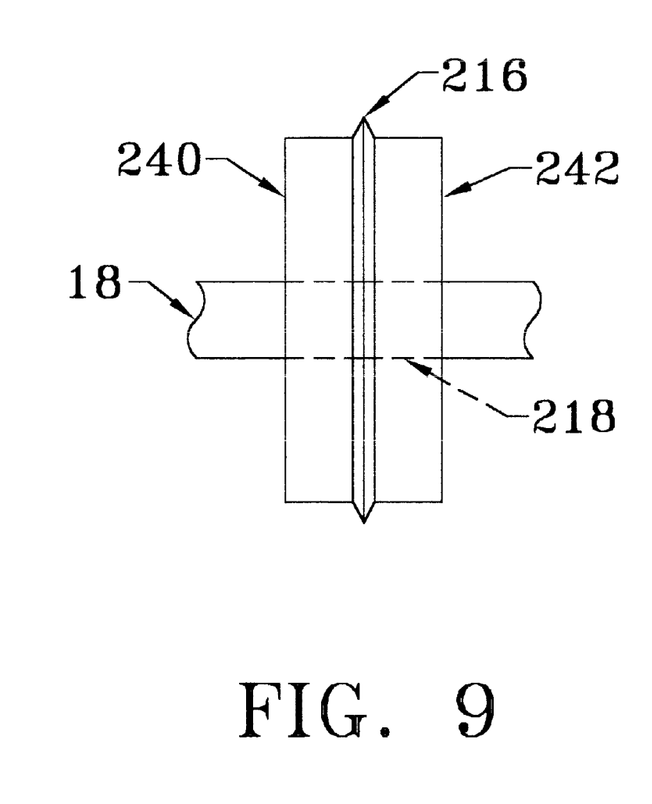
FIG. 9 is a front view of the unitary cutting wheel and rotary type depth gage stop of FIG. 8.

A unitary cutting wheel and rotary depth gage stop members is illustrated in FIGS. 8 and 9. Cutting wheel 216 has rotary depth gage stop members 240 and 242 formed thereon to provide a single piece. Axle 218 passes through an opening through the center thereof. The unitary device of FIGS. 8 and 9 could be used to replace cutting wheel 16 and rotary depth gage stop members 40 and 42 in the embodiment illustrated in FIG. 3.

It will be obvious to those having skill in the art that many changes may be made to the details of the above-described embodiments of this invention without departing from the underlying principles thereof. The scope of the present invention should, therefore, be determined only by the following claims.

The invention claimed is:

1. In a tubing cutter including a roller or rollers and an oppositely disposed rotary cutting wheel, the tubing to be cut being supported between said roller or rollers and said cutting wheel, said tubing cutter adapted to be rotated around said tubing while advancing said roller or rollers towards said cutting wheel to thereby cause said cutting wheel to cut into the wall of said tubing, the improvement for cutting thin walled metallic tubing comprising disposing a depth gage stop member adjacent each side of said rotary cutting wheel, each of said stop members having an outer terminus which, when said cutting wheel first contacts the outer surface of said tubing, is removed from said outer surface of said tubing a distance that is less than the wall thickness of said tubing, whereby during cutting of said tubing by said cutting wheel the outer terminus of each of said stop members is adapted to come into contact with said outer surface of said tubing being cut before the rotary cutting wheel has cut completely through said wall of said tubing to thereby terminate the cutting action of said rotary cutting wheel.

2. In a tubing cutter including a roller or rollers and an oppositely disposed rotary cutting wheel of a given radius, the tubing to be cut being supported between said roller or rollers and said cutting wheel, said tubing cutter adapted to be rotated around said tubing while advancing said roller or rollers towards said cutting wheel to thereby cause said cutting wheel to cut into the wall of said tubing, the improvement for cutting thin walled metallic tubing comprising a depth gage stop member including a generally C-shaped body with a base and a leg extending substantially perpendicularly from said base adjacent each side of said cutting wheel, said legs being substantially parallel and each of said legs having substantially the same length, said length being less than the radius of said cutting wheel by a distance that represents less than the wall thickness of the tubing to be cut by said cutting wheel, the outer ends of said legs being adapted to come into contact with the outer surface of said tubing upon such cutting depth being achieved.

3. The tubing cutter of claim 2 said cutter has a head with said rotary cutting wheel being partially located within said head and mounted on an axle having ends rotatably attached to said head, and wherein said legs are both located outside said head of said cutter.

4. The tubing cutter of claim 2 wherein said legs of said depth gage stop member are rotatably attached at a mid-portion thereof to said axle whereby said depth gage stop member may be rotated.

5. In a tubing cutter including a cutter head, a rotary cutting wheel of a given radius located partially within said cutter head, and a roller or rollers disposed oppositely said cutting wheel, the tubing to be cut being supported between said roller or rollers and said cutting wheel, said tubing cutter being adapted to be rotated around said tubing while advancing said roller or rollers towards said cutting wheel to thereby cause said cutting wheel to cut into the wall of said tubing, the improvement for cutting thin walled metallic tubing comprising a cavity disposed within said cutter head on each side of said cutting wheel, a stationary depth gage stop member body adapted to be placed into each of said cavities of said cutter head, each of said bodies having a length that is less than the radius of said cutting wheel by a distance that represents less than the wall thickness of the tubing to be cut by said cutting wheel, the outer ends of said bodies being adapted to contact the outer surface of said tubing upon such cutting depth being achieved.

6. In a tubing cutter including a cutter head, a rotary cutting wheel of a given radius located partially within said cutter head, and a roller or rollers disposed oppositely said cutting wheel, the tubing to be cut being supported between said roller or rollers and said cutting wheel, said tubing cutter being adapted to be rotated around said tubing while advancing said roller or rollers towards said cutting wheel to thereby cause said cutting wheel to cut into the wall of said tubing, the improvement for cutting thin walled metallic tubing comprising a rotary depth gage stop member comprised of a pair of rollers, one roller being located on each side of said cutting wheel, the major planes of said rollers and said cutting wheel being substantially parallel, the radius of each of said rollers being less than the radius of said cutting wheel by a distance that represents less than the wall thickness of the tubing to be cut by said cutting wheel, the outer ends of said rollers being adapted to contact the outer surface of said tubing upon such cutting depth being achieved.

7. The tubing cutter of claim 6 wherein said rollers are both located within said head of said cutter.

8. The tubing cutter of claim 6 wherein said rollers are both located outside said head of said cutter.

9. The tubing cutter of claim 6 wherein said rollers and said cutting wheel are unitary.

* * * * *